Figure 1:
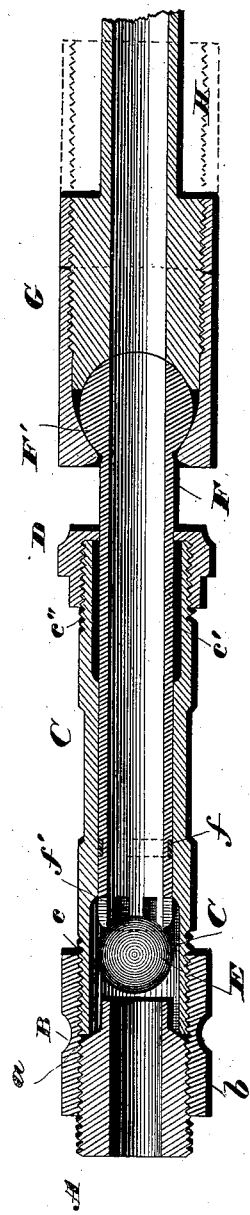

(No Model.)

2 Sheets—Sheet 1.

J. BERSCH.
PIPE COUPLING.

No. 375,253.

Patented Dec. 20, 1887.

WITNESSES
G. S. Elliott.

John Bersch.
INVENTOR

Attorney (No Model.) 2 Sheets—Sheet 2.
J. BERSCH.
PIPE COUPLING.
No. 375,253. Patented Dec. 20, 1887.
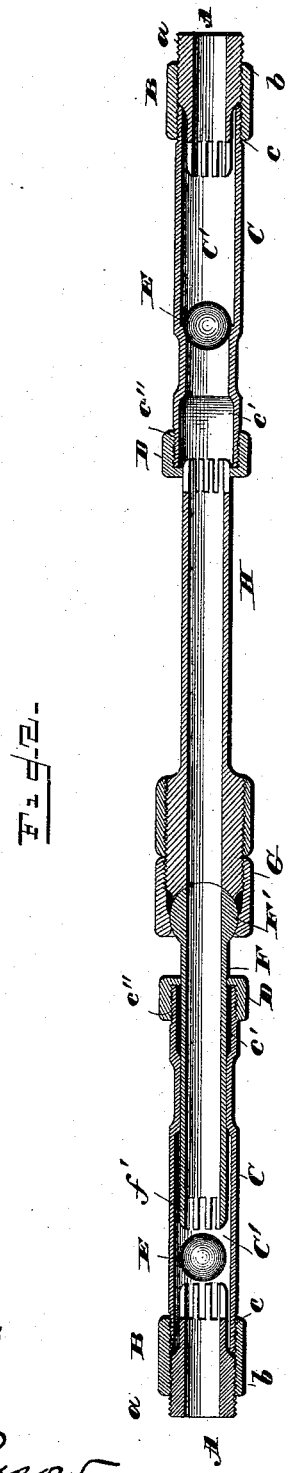
WITNESSES
G. S. Elliott
E. W. Johnson
John Bersch
INVENTOR
Attorney

UNITED STATES PATENT OFFICE.

JOHN BERSCH, OF KINGSTON, PENNSYLVANIA.

PIPE-COUPLING.

SPECIFICATION forming part of Letters Patent No. 375,253, dated December 20, 1887.

Application filed March 10, 1887. Serial No. 230,409. (No model.)

*To all whom it may concern:*

Be it known that I, JOHN BERSCH, a citizen of the United States of America, residing at Kingston, in the county of Luzerne and State of Pennsylvania, have invented certain new and useful Improvements in Pipe-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in couplings for connecting the ends of steam-pipes between cars, the object of the invention being to provide a coupling which will be tight, the parts of which may be readily connected to each other, and when connected may have a movement upon each other without causing leakage, the coupling being so constructed that when the parts are connected to each other a free passage for the fluid or steam is provided through which it may flow, and when the parts are disconnected the opening through the coupling will be automatically closed.

With the above ends in view my invention consists in the construction and combination of the parts, as will be hereinafter fully set forth, pointed out in the claims, and shown in the drawings, in which—

Figure 1 is a longitudinal sectional view of a pipe-coupling constructed in accordance with my invention, and Fig. 2 is a longitudinal sectional view of a modification of my invention.

A refers to one end of the coupling, to which a pipe or other suitable steam or fluid connection is attached in the usual way. The end adjacent thereto is enlarged and screw-threaded, as shown at $a$, over which screw-threads fits an internally-screw-threaded sleeve, B, one end of said sleeve, as shown at $b$, being flattened or formed into a nut, so that a wrench can be used for turning said sleeve.

C refers to a cylinder, one end of which is screw-threaded, as shown at $c$, to engage with the sleeve B, and this cylinder has its ends at its inner side enlarged, as shown at $C'$ and $c'$, the enlarged portion $c'$ being for the reception of a suitable packing, which is held in place by an open-ended cap, D, which is internally screw-threaded to engage with the threads $c''$, formed in its ends. The space C is for the reception of a ball-valve, E.

F refers to a piston, which is of about substantially the same diameter externally as the diameter of the cylinder C, and this piston may be provided near one end with a suitable band-packing, $f$. The end of the cylinder adjacent to the packing is provided with a series of slots, $f'$, or other suitable openings, which will permit the passage of the steam through the same even when the ball-valve contacts with the end of said cylinder. The opposite end of the piston F has formed thereon a ball, F', which is held within the socket G, this socket being ground to conform therewith, and is provided with an opening, through which the steam passes. The opposite end of this coupling G is screw-threaded for the reception of the connection H, to which the steam-pipe is attached in any suitable manner. The end of the connection H adjacent to the ball F' is also ground to conform therewith. The cylinder C, adjacent to the cavity which confines the ball-valve in place, is also ground to conform to the ball.

The device hereinbefore described is especially adapted for coupling steam-pipes used for heating purposes in railway-cars, and the parts may be readily connected and separated, and when separated the steam will be automatically cut off; and with a coupling constructed as hereinbefore described it is only necessary to give the same any attention when the cars are being coupled to each other.

By providing the coupling with a ball-and-socket joint, as herein shown, a certain amount of vibratory or oscillatory play is allowed between the parts, as well as a longitudinal play, as the piston can slide within the cylinder.

In operation the steam will usually enter from the locomotive-boiler or other steam supply through the stationary conveying-tubes to the space in the cylinder, when the same will flow around or over the ball-valve and through the openings $f'$ through the piston to the adjacent steam-supply pipe, and when the coupling is separated by detaching the cars from each other the piston will be withdrawn from the cylinder and the steam will force the ball-valve against its seat, thus automatically cutting off the steam.

The coupling H, heretofore referred to, may be made precisely the same as the coupling A, with the exception of its end which bears against the ball. This coupling is attached to the car, preferably, by a flexible connection of any suitable construction, and the connecting-pipes are attached to the projecting threaded ends of the couplings A and H.

The coupling A may be slotted similar to the piston, so that the steam can have a free passage either way, thus providing means whereby the steam can pass from the cars when they are reversed or turned end for end.

The connection H may be made with its threaded portion in two parts, so that one part will act as a jam-nut upon the other.

I claim—

1. In a device for coupling steam-pipes for car-heaters, the combination of a cylinder having an enlarged portion which is provided with a valve-seat, a piston adapted to slide within said cylinder, so as to project beyond the valve-seat, and a valve located within the enlarged portion of the cylinder, so that the valve will be held off its seat when the parts are coupled to each other, substantially as shown, and means for connecting the same to a steam-supply pipe.

2. In a pipe-coupling for the purpose set forth, a cylinder provided with an enlarged portion having a valve-seat, a piston adapted to slide within said cylinder and provided with a slotted end, said piston being adapted to hold a valve off its seat in the cylinder when the parts are connected, and a ball-valve located within the enlarged portion of the cylinder, and a portion, A, and coupling B, for holding the valve within the cylinder, substantially as shown.

3. In a pipe-coupling, a cylinder provided with a suitable packing and a valve-seat, in combination with a piston having a slotted end, which is adapted to slide within said cylinder, said piston being attached to the adjacent coupling by a universal joint, and a valve, E, substantially as shown, and for the purpose set forth.

4. In a pipe-coupling, the combination of the cylinder C, having an enlarged opening, C′, formed therein at one end, and an opening, c′, for the reception of packing at the opposite end, sleeve B, cap D, and piston F, adapted to slide within said cylinder, and provided at one end with slots f′ and at the opposite end with an enlarged portion, F′, the parts G and H, and a ball-valve, E, the parts being organized substantially as shown, and for the purpose set forth.

In testimony whereof I affix my signature in presence of two witnesses.

JOHN BERSCH.

Witnesses:
W. B. FISH,
E. SMITH.